United States Patent
Gjerde et al.

(10) Patent No.: US 8,270,129 B2
(45) Date of Patent: Sep. 18, 2012

(54) DEVICE ARRANGED FOR CONVERTING AN AC INPUT VOLTAGE TO A DC OUTPUT VOLTAGE

(75) Inventors: Knut-Ivar Gjerde, Drammen (NO); Erik Myhre, Asker (NO); Roberto Rojas, Stockholm (SE); Jan Tore Brastad, Drammen (NO)

(73) Assignee: Elktek Valere AS, Drammen (NO)

( * ) Notice: Subject to any disclaimer, the term of this patent is extended or adjusted under 35 U.S.C. 154(b) by 272 days.

(21) Appl. No.: 12/740,652

(22) PCT Filed: Oct. 30, 2008

(86) PCT No.: PCT/NO2008/000383
§ 371 (c)(1),
(2), (4) Date: Jul. 16, 2010

(87) PCT Pub. No.: WO2009/058024
PCT Pub. Date: May 7, 2009

(65) Prior Publication Data
US 2010/0277837 A1 Nov. 4, 2010

Related U.S. Application Data

(60) Provisional application No. 60/983,938, filed on Oct. 31, 2007.

(30) Foreign Application Priority Data

Oct. 31, 2007 (GB) .................................. 0721413.3

(51) Int. Cl.
*H02H 3/22* (2006.01)
(52) U.S. Cl. ........................................ 361/18; 361/91.1
(58) Field of Classification Search ............ 361/18, 361/91.1, 111
See application file for complete search history.

(56) References Cited

U.S. PATENT DOCUMENTS
6,088,209 A 7/2000 Sink

2005/0105311 A1* 5/2005 Soldano ........................ 363/89

FOREIGN PATENT DOCUMENTS

| DE | 9216662 U1 | 1/1993 |
|----|------------|--------|
| EP | 0476278 A2 | 3/1992 |
| GB | 2216686 A  | 10/1989 |

OTHER PUBLICATIONS

OTHER PUBLICATIONS

Huber et al., "Performance Evaluation of Bridgeless PFC Boost Rectifers"1-4244-0714-1/07, 2007, IEEE. pp. 165-171.
Kong et al., "Common mode EMI noise suppression in bridgeless boost PFC converter"PFC converter 1-4244-0714-1/07, 2007, IEEE, pp. 929-935.
Search Report dated Feb. 5, 2008 issued in corresponding Appl. No. GB0721413.3.

* cited by examiner

*Primary Examiner* — Danny Nguyen
(74) *Attorney, Agent, or Firm* — Birch, Stewart, Kolasch & Birch, LLP

(57) ABSTRACT

The present invention relates to a device arranged for converting an AC input voltage to a DC output voltage, comprising a bridgeless boost converter; and a surge protection system. The surge protection system comprises a first protection diode (Dprot1), where the anode is connected to a first AC input terminal and the cathode is connected to a positive boost output terminal (Obp); a second protection diode (Dprot2), where the anode is connected to a negative boost output terminal (Obn) and the cathode is connected to the first AC input terminal; a third protection diode (Dprot3), where the anode is connected to a second AC input terminal and the cathode is connected to the positive boost output terminal (Obp); and a fourth protection diode (Dprot4), where the anode is connected to the negative boost output terminal (Obn) and the cathode is connected to the second AC input terminal.

8 Claims, 5 Drawing Sheets

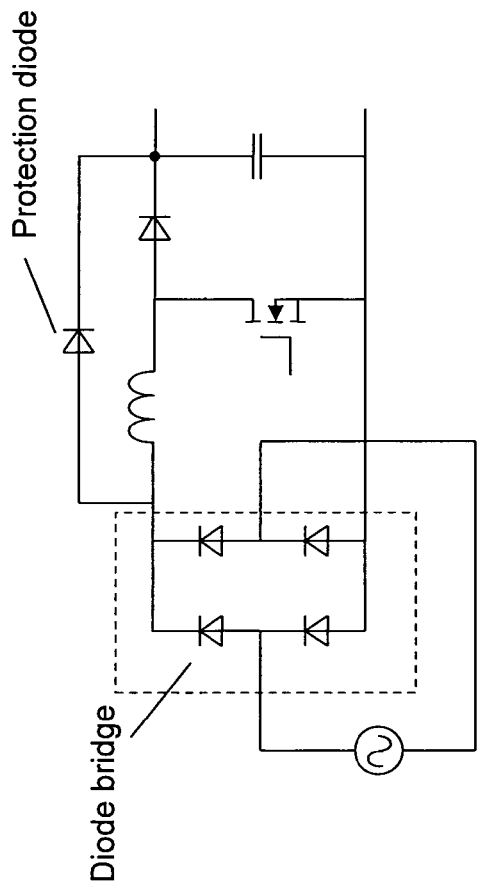
Fig. 1A: Prior Art
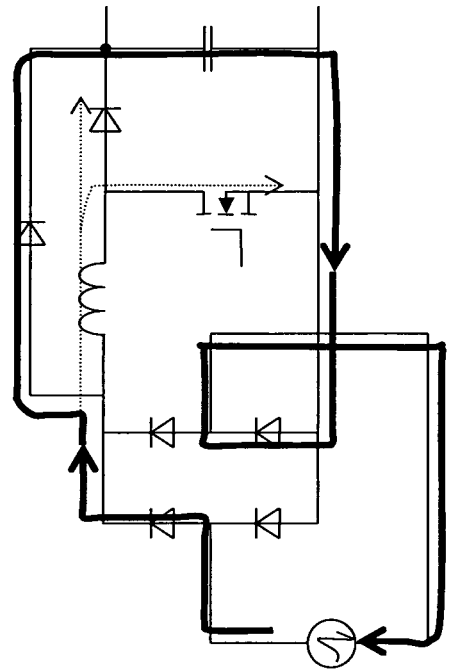
Fig. 1B: Prior Art

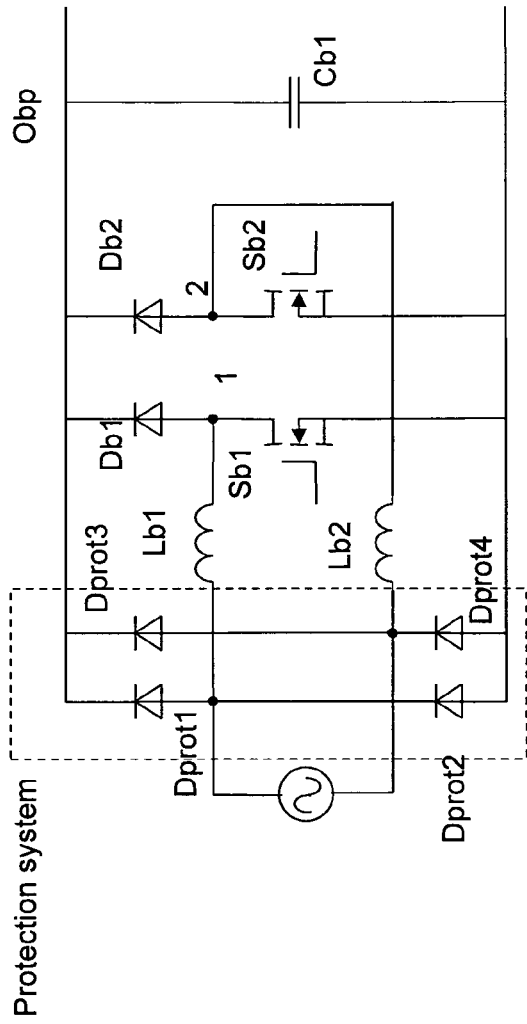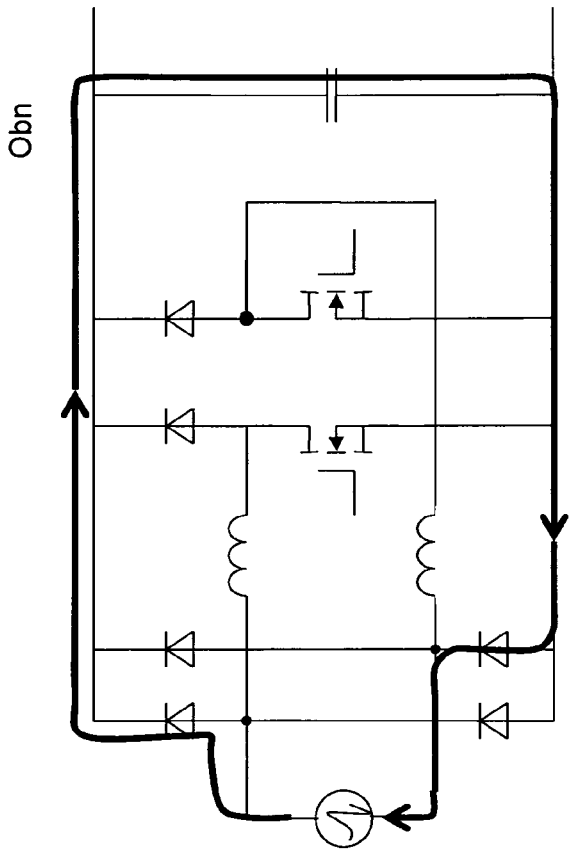
Fig. 3A
Fig. 3B

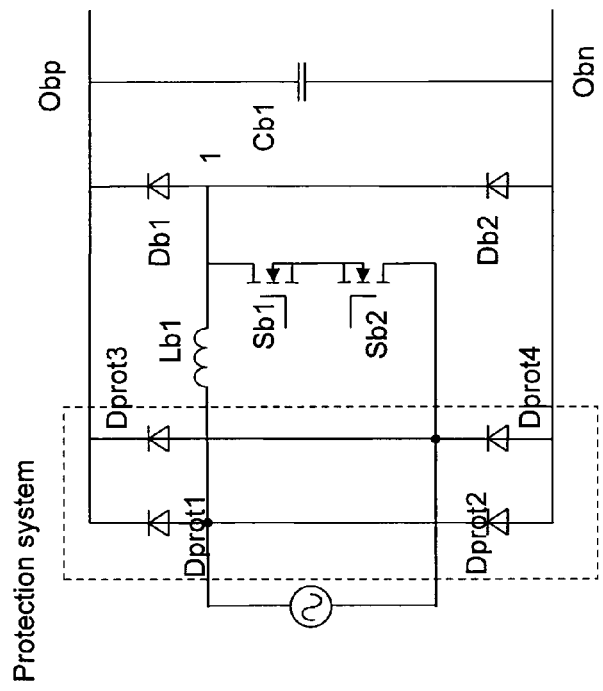
Fig. 5A
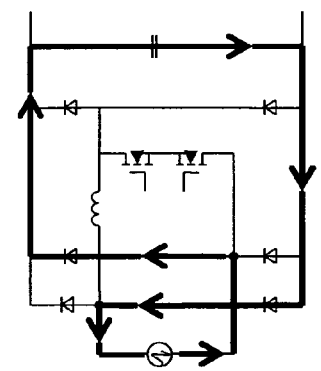
Fig. 5C
Fig. 5B

DEVICE ARRANGED FOR CONVERTING AN AC INPUT VOLTAGE TO A DC OUTPUT VOLTAGE

CROSS REFERENCE TO RELATED APPLICATIONS

This application is the National Phase of PCT/NO2008/000383 filed on Oct. 30, 2008 which claims priority under 35 U.S.C 119(e) of U.S. Provisional Application No. 60/983,938 filed on Oct. 31, 2007 and under 35 U.S.C 119(a) to Patent Application No. 0721413.3 filed in the United Kingdom on Oct. 31, 2007. The entire contents of the above applications are hereby incorporated by reference into the present application.

FIELD OF THE INVENTION

The present invention relates to a device arranged for converting an AC input voltage to a DC output voltage.

PRIOR ART

Several types of converters are known for use in power supply systems, where there is a need to convert an AC power to a controlled DC power. The AC power will usually be supplied from an AC power source, such as the mains. The DC power is supplied to equipment such as telecommunication equipment, broad band data communication equipment (GSM/UMTS base stations etc), military equipment, medical equipment etc.

The requirements for the DC power can vary, but usually it is important to keep the DC voltage within certain boundaries and also to protect the DC side from irregularities in the voltage/current on the AC side. Such irregularities can be surges, i.e. surge voltages/currents that occur in the AC mains due to lightning, failures in the AC mains or voltage variations caused by of increased or decreased load etc.

A prior art boost converter comprising a diode bridge (dashed box) on the input side is shown in FIG. 1A. The boost converter comprises a protection diode in parallel with the boost inductor and boost diode. FIG. 1B shows how a surge current (solid arrows) from the AC input flows through the boost converter and through the protection diodes. The dashed arrows are illustrating how the current would flow without the protection diode. As can be seen, the protection diode protects the inductor, switch and boost diode, and only the protection diode needs to be dimensioned for the surge current.

There are also known several types of bridgeless boost converters, see for example "Performance Evaluation of Bridgeless PFC Boost Rectifiers", Huber, L. et al, Applied Power Electronics Conference, 2007.

The present invention provides a device arranged for converting an AC input voltage to a DC output voltage comprising a bridgeless boost converter and protection system which provides protection to the boost converter from surges and other unwanted occurrences from the AC mains. Consequently, the protection system will also provide protection to the load or other components on the DC side of the power supply system.

Due to environmental issues and also increasing energy costs, there is an increased demand for power supply systems with improved power efficiency. Therefore, the object of the invention is also to contribute to increased power efficiency for the power supply system.

SUMMARY OF THE INVENTION

The present invention relates to a device arranged for converting an AC input voltage to a DC output voltage, comprising:
 a bridgeless boost converter; and
 a surge protection system comprising:
  a first protection diode, where the anode is connected to a first AC input terminal and the cathode is connected to a positive boost output terminal;
  a second protection diode, where the anode is connected to a negative boost output terminal and the cathode is connected to the first AC input terminal;
  a third protection diode, where the anode is connected to a second AC input terminal and the cathode is connected to the positive boost output terminal; and
  a fourth protection diode, where the anode is connected to the negative boost output terminal and the cathode is connected to the second AC input terminal.

In an aspect of the invention, the bridgeless boost converter comprises:
 a boost inductor device comprising at least one boost inductor;
 a boost diode device comprising at least one boost diode;
 a boost switch device comprising at least one boost switch; and
 a boost capacitor device comprising at least one boost capacitor.

In an aspect of the invention, the protection diodes are dimensioned to withstand a surge.

In an aspect of the invention the boost inductor device comprises a boost inductor having a first end connected to a first AC input terminal and a second end connected to a first node; the boost diode device comprises a first boost diode and a second boost diode, where the first boost diode is connected between the first node and the positive boost output terminal; and the boost switch device comprising a first boost switch connected to the first node.

In an aspect of the invention, the boost inductor device comprises a boost inductor having a first end connected to the first (AC) input terminal and a second end connected to a first node; the boost diode device comprises a first boost diode connected between the first node and the positive boost output terminal and a second boost diode connected between the negative output terminal and the first node; the boost switch device comprises a first boost switch and a second boost switch serially connected between the first node and the second AC input terminal; and the boost capacitor device comprises a first boost capacitor connected between the positive output terminal and negative output terminal.

In an aspect of the invention, the boost inductor device comprises a first boost inductor having a first end connected to the first AC input terminal and a second end connected to a first node and a second boost inductor having a first end connected to the second AC input terminal and a second node; the boost diode device comprises a first boost diode connected between the first node and the positive boost output terminal and a second boost diode connected between the negative output terminal and the first node; the boost switch device comprises a first boost switch and a second boost switch serially connected between the first node and the second node; and the boost capacitor device comprises a first boost capacitor connected between the positive output terminal and the second node and a second boost capacitor connected between the second node and the negative output terminal.

In an aspect of the invention, the boost inductor device comprises a first boost inductor having a first end connected to a first AC input terminal and a second end connected to a first node and a second boost inductor having a first end connected to a second AC input terminal and a second end connected to a second node; the boost diode device comprises a first boost diode connected between the first node and the positive boost output terminal and a second boost diode connected between the second node and the positive boost output terminal; the boost switch device comprises a first boost switch connected between the first node and the negative boost output terminal and a second boost switch connected between the second node and the negative boost output terminal; and the boost capacitor device comprises a first boost capacitor connected between the positive output terminal and negative output terminal.

DETAILED DESCRIPTION

Embodiments of the invention will now be described with reference to the enclosed drawings, where:

FIG. 1A illustrates a prior art boost converter with diode bridge and a protection diode;

FIG. 1B illustrates the propagation of a surge through the converter in FIG. 1A;

FIG. 3A illustrates the topology of a second embodiment of the invention (a bridgeless boost converter with two input inductors and protection system);

FIG. 3B illustrates the propagation of a surge through the converter in FIG. 3A;

FIG. 5A illustrates the topology of a fourth embodiment of the invention; and

FIG. 5B and FIG. 5C illustrate the propagation of a positive and a negative surge through the converter in FIG. 5A respectively.

It is now referred to FIG. 2, FIG. 3A, FIG. 4A and FIG. 5A, where different embodiments of a device arranged for converting an AC input voltage to a DC output voltage are shown. The AC voltage is normally the AC mains. The DC output voltage can be supplied directly to a load or can be supplied to a DC-DC converter for further improving the quality of the DC voltage delivered to a load.

First Embodiment

Figure 2:
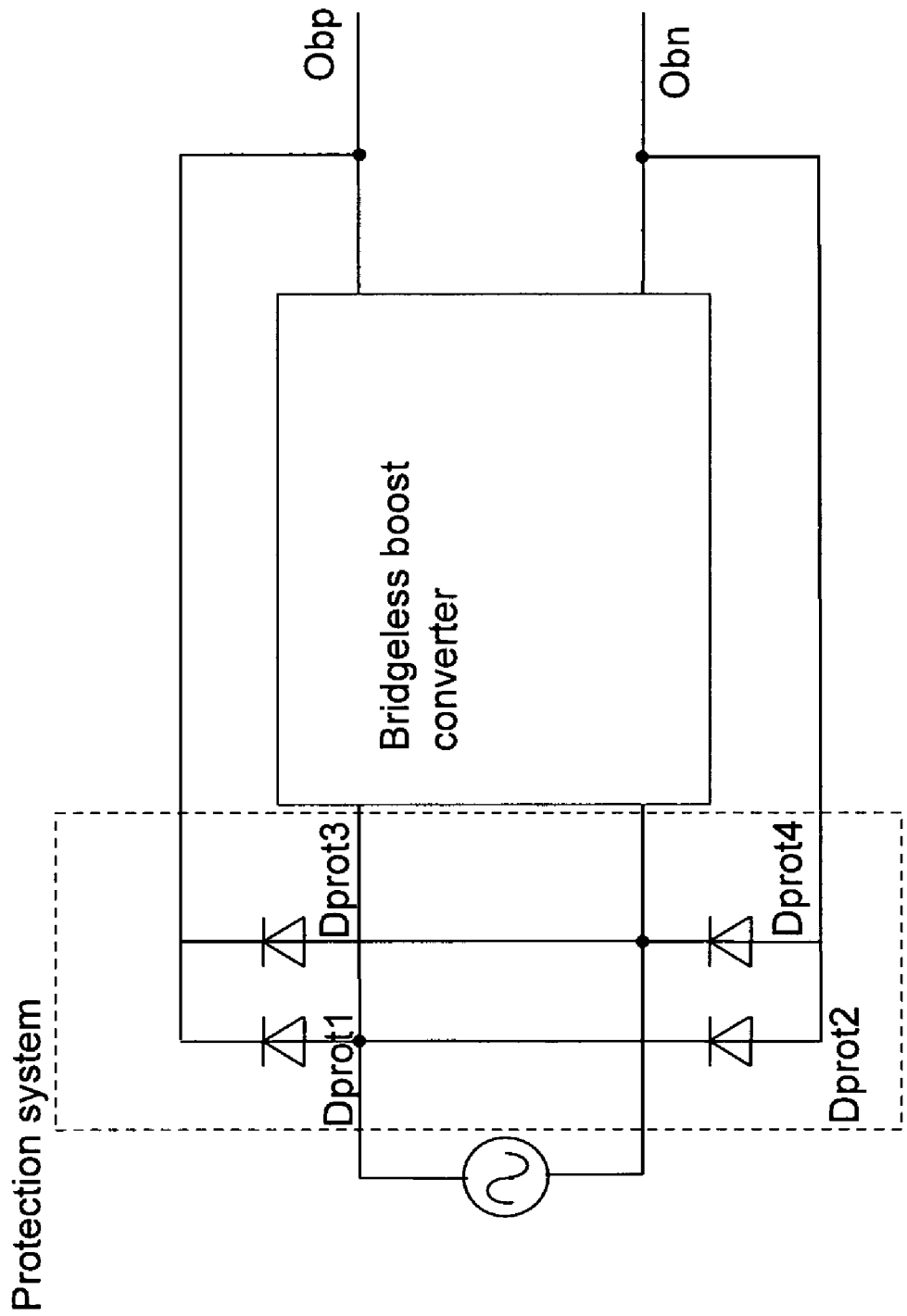
FIG. 2 illustrates a first embodiment of the present invention.

According to the first embodiment shown in FIG. 2, the device comprises the following components:
a bridgeless boost converter; and
a surge protection system.

The surge protection system comprises four protection diodes:
a first protection diode Dprot1, where the anode is connected to a first AC input terminal and the cathode is connected to a positive boost output terminal Obp;
a second protection diode Dprot2, where the anode is connected to a negative boost output terminal Obn and the cathode is connected to the first AC input terminal;
a third protection diode Dprot3, where the anode is connected to a second AC input terminal and the cathode is connected to the positive boost output terminal Obp; and
a fourth protection diode Dprot4, where the anode is connected to the negative boost output terminal Obn and the cathode is connected to the second AC input terminal.

The surge protection system is illustrated by means of a dashed box in the drawings.

The bridgeless boost converter is illustrated as a solid drawn box in FIG. 2, and comprises a bridgeless boost converter, for example as shown and described in Huber, L. et al mentioned in the introduction.

A typical bridgeless boost converter comprises:
a boost inductor device comprising at least one boost inductor;
a boost diode device comprising at least one boost diode;
a boost switch device comprising at least one boost switch; and
a boost capacitor device comprising at least one boost capacitor.

It should be noted that the protection diodes Dprot1, Dprot2, Dprot3 and Dprot4 are dimensioned to withstand a surge, i.e. a surge current/voltage that is arriving from the AC input, for example because of a lightning that strikes the AC mains net.

Second Embodiment

It is now referred to FIG. 3A. The protection system is the same as in the first embodiment, and will not be described in detail here.

The boost inductor device comprises a first boost inductor Lb1 having a first end connected to the first AC input terminal and a second end connected to a first node 1. Moreover, the boost inductor device comprises a second boost inductor Lb2 connected between the second AC input terminal and a second node 2.

The boost diode device comprises a first boost diode Db1 and a second boost diode Db2. The first boost diode Db1 is connected between the first node 1 and the positive boost output terminal Obp. The second boost diode Db2 is connected between the second node 2 and the positive boost output terminal Obp. It should be noted that the cathodes of the first and second boost diodes Db1, Db2 are connected to the positive boost output terminal Obp.

The boost switch device comprises a first boost switch Sb1 connected between the first node 1 and the negative boost output terminal Obn and a second boost switch Sb2 connected between the second node 2 and the negative boost output terminal Obn.

The boost capacitor device comprises a boost capacitor Cb1 connected between the positive boost output terminal Obp and the negative boost output terminal Obn.

When a positive surge current arrives on the first AC input terminal, the first protection diode Dprot1 starts to conduct, as shown in FIG. 3B. The current is propagating through the first boost capacitor Cb1 and then back through the fourth protection diode Dprot4 to the second AC input terminal. A negative surge current will propagate through the third protection diode Dprot3, the boost capacitor Cb1 and the second protection diode Dprot2.

Consequently, none of the main components of the bridgeless boost converter, such as the boost inductor, the boost diodes, or the boost switches will be conducting any substantial surge current, and hence those components are protected from being damaged by the surge current.

Third Embodiment

Figure 4A:
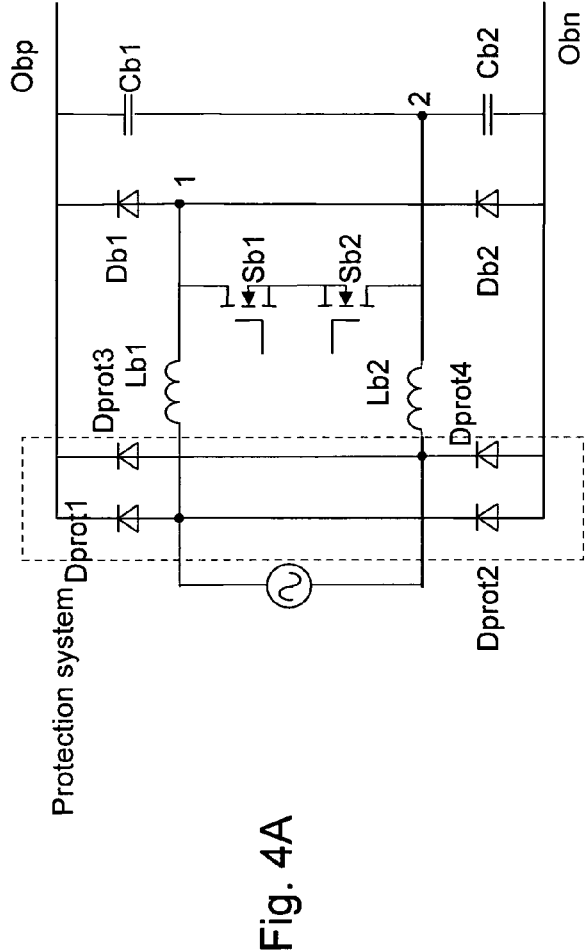
FIG. 4A illustrates the topology of a third embodiment of the invention.
Figure 4B:
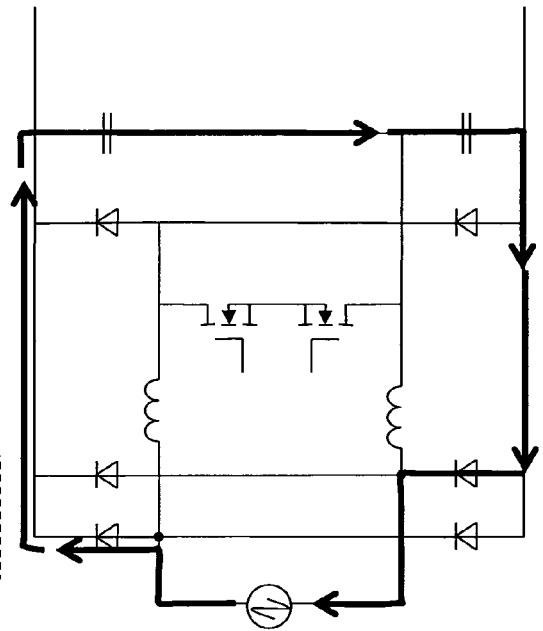
FIG. 4B illustrates the propagation of a surge through the converter in FIG. 4A.

It is now referred to FIGS. 4A and 4B, illustrating a device with a three-level bridgeless boost converter and a protection system. The protection system is the same as in the first and second embodiment, and will not be described in detail here.

The boost inductor device comprises a first boost inductor Lb1 connected between the first AC input terminal and a first node 1. Moreover, the boost inductor device comprises a second boost inductor Lb2 connected between the second AC input terminal and a second node 2.

The boost diode device comprises a first boost diode Db1 and a second boost diode Db2. The first boost diode Db1 is connected between the first node 1 and the positive boost output terminal Obp. The second boost diode Db2 is connected between the negative output terminal Obn and the first node 1. It should be noted that the first boost diode Db1 is connected with its anode to the first node 1 and the second boost diode Db2 is connected with its cathode to the first node 1.

The boost switch device comprises a first boost switch Sb1 connected to the first node 1 on one end and to a second boost switch Sb2 on the other end. The second boost switch Sb2 is connected between the first boost switch Sb1 and the second node 2. The boost switches Sb1, Sb2 are connected in series as a so-called bidirectional switch.

The boost capacitor device comprises a first boost capacitor Cb1 connected between the positive output terminal Obp and the second node 2 and a second boost capacitor Cb2 connected between the second node 2 and the negative output terminal Obn.

As can be seen from FIG. 4B, in similarity to the above embodiment, when a positive surge current is arriving on the first AC input terminal, none of the main components of the bridgeless boost converter, such as the boost inductor, the boost diodes, or the boost switches will be conducting any substantial surge current, and hence those components are protected from being damaged by it.

In an alternative embodiment, the second boost inductor Lb2 can be omitted in the bridgeless boost converter. Consequently, the protection diodes Dprot3 and Dprot4 of the protection system also can be omitted.

Fourth Embodiment

It is now referred to FIGS. 5A, 5B and 5C, illustrating a two-level bridgeless boost converter with a bi-directional switch. The protection system is the same as in the first embodiment, and will not be described in detail here.

The boost inductor device comprises a first boost inductor Lb1 having a first end connected to the first AC input terminal and a second end connected to a first node 1.

The boost diode device comprises a first boost diode Db1 and a second boost diode Db2. The first boost diode Db1 is connected between the first node 1 and the positive boost output terminal Obp. The second boost diode Db2 is connected between the negative output terminal Obn and the first node 1. It should be noted that the first boost diode Db1 is connected with its anode to the first node 1 and the second boost diode Db2 is connected with its cathode to the first node 1.

The boost switch device comprises a first boost switch Sb1 connected between the first node 1 and a second boost switch Sb2. The second boost switch Sb2 is connected between the first boost switch Sb1 and the second AC input terminal. Consequently, the first and second boost switches Sb1 and Sb2 are connected in series as a so-called bidirectional switch between the first node 1 and the second AC input terminal.

Moreover, the boost capacitor device comprises a boost capacitor Cb1 connected between the positive output terminal Obp and negative output terminal Obn.

As can be seen from FIGS. 5B and 5C, in similarity to the above embodiments, when a positive or negative surge current is arriving on the first AC input terminal, none of the main components of the bridgeless boost converter, such as the boost inductor, the boost diodes, or the boost switches will be conducting any substantial surge current, and hence those components are protected from being damaged by the surge current.

In an alternative embodiment, the bidirectional switches can be replaced by a diode bridge and a MOSFET switch.

In the above description, the switches are of type MOSFET switches. Alternatively, the switches are switches with intrinsic diodes or switches connected in parallel with anti-parallel diodes. An example of alternative switches is IGBTs connected in parallel with anti-parallel diodes.

The switches are controlled by a control system based on parameters such as measured voltages and/or currents. The method used by the control system for controlling the switches would be known for a man skilled in the art. The control system can be implemented by means of one or several analogue control circuits or digital signal processors.

Further modifications and variations will be obvious for a skilled man when reading the description above. The scope of the invention will appear from the following claims and their equivalents.

The invention claimed is:

1. Device arranged for converting an AC input voltage to a DC output voltage, comprising:
    a bridgeless boost converter; and
    a surge protection system comprising:
        a first protection diode (Dprot1), where the anode is connected to a first AC input terminal of the bridgeless boost converter and the cathode is connected to a positive boost output terminal (Obp) of the bridgeless boost converter;
        a second protection diode (Dprot2), where the anode is connected to a negative boost output terminal (Obn) of the bridgeless boost converter and the cathode is connected to the first AC input terminal of the bridgeless boost converter;
        a third protection diode (Dprot3), where the anode is connected to a second AC input terminal of the bridgeless boost converter and the cathode is connected to the positive boost output terminal (Obp) of the bridgeless boost converter; and
        a fourth protection diode (Dprot4), where the anode is connected to the negative boost output terminal (Obn) of the bridgeless boost converter and the cathode is connected to the second AC input terminal of the bridgeless boost converter.

2. Device according to claim 1, where the bridgeless boost converter comprises:
    a boost inductor device comprising at least one boost inductor;
    a boost diode device comprising at least one boost diode;
    a boost switch device comprising at least one boost switch; and
    a boost capacitor device comprising at least one boost capacitor.

3. Device according to claim 1, where the protection diodes (Dprot1, Dprot2, Dprot3, Dprot4) are dimensioned to withstand a current/voltage surge.

4. Device according to claim 2, where:
    the boost inductor device comprises a boost inductor (Lb1) having a first end connected to a first AC input terminal and a second end connected to a first node (1);
    the boost diode device comprises a first boost diode (Db1) and a second boost diode (Db2), where the first boost diode (Db1) is connected between the first node (1) and the positive boost output terminal (Obp);
    the boost switch device comprises a first boost switch (Sb1) connected to the first node (1).

5. Device according to claim 2, where:
the boost inductor device comprises a boost inductor (Lb1) having a first end connected to the first (AC) input terminal and a second end connected to a first node (1);
the boost diode device comprises a first boost diode (Db1) connected between the first node (1) and the positive boost output terminal (Obp) and a second boost diode (Db2) connected between the negative output teiminal (Obn) and the first node (1);
the boost switch device comprises a first boost switch (Sb1) and a second boost switch (Sb2) are connected in series as a bidirectional switch between the first node (1) and the second AC input terminal; and
the boost capacitor device comprises a first boost capacitor (Cb1) connected between the positive output terminal (Obp) and negative output terminal (Obn).

6. Device according to claim 2, where:
the boost inductor device comprises a first boost inductor (Lb1) having a first end connected to the first AC input terminal and a second end connected to a first node (1) and a second boost inductor (Lb2) having a first end connected to the second AC input terminal and a second node (2);
the boost diode device comprises a first boost diode (Db1) connected between the first node (1) and the positive boost output terminal (Obp) and a second boost diode (Db2) connected between the negative output terminal (Obn) and the first node (1);
the boost switch device comprises a first boost switch (Sb1) and a second boost switch (Sb2) are connected in series as a bidirectional switch between the first node (1) and the second node (2); and
the boost capacitor device comprises a first boost capacitor (Cb1) connected between the positive output terminal (Obp) and the second node (2) and a second boost capacitor (Cb2) connected between the second node (2) and the negative output terminal (Obn).

7. Device according to claim 2, where:
the boost inductor device comprises a first boost inductor (Lb1) having a first end connected to a first AC input terminal and a second end connected to a first node (1) and a second boost inductor (Lb2) having a first end connected to a second AC input terminal and a second end connected to a second node (2);
the boost diode device comprises a first boost diode (Db1) connected between the first node (1) and the positive boost output terminal (Obp) and a second boost diode (Db2) connected between the second node (2) and the positive boost output terminal (Obp);
the boost switch device comprises a first boost switch (Sb1) connected between the first node (1) and the negative boost output teiminal (Obn) and a second boost switch (Sb2) connected between the second node (2) and the negative boost output teiminal (Obn); and
the boost capacitor device comprises a boost capacitor (Cb1) connected between the positive output terminal (Obp) and negative output terminal (Obn).

8. Device according to claim 2, where the boost capacitor device is connected between the positive output terminal (Obp) and the negative output terminal (Obn).

* * * * *